US011761287B2

(12) United States Patent
Burdzy et al.

(10) Patent No.: US 11,761,287 B2
(45) Date of Patent: Sep. 19, 2023

(54) DUAL HARDNESS SEALING ELEMENTS FOR BLOWOUT PREVENTER

(71) Applicant: LANXESS SOLUTIONS US INC., Shelton, CT (US)

(72) Inventors: Matthew P. Burdzy, South Windsor, CT (US); Thomas Harald Peter, Southbury, CT (US)

(73) Assignee: LANXESS Corporation, Pittsburgh, PA (US)

( * ) Notice: Subject to any disclaimer, the term of this patent is extended or adjusted under 35 U.S.C. 154(b) by 0 days.

(21) Appl. No.: 17/426,682

(22) PCT Filed: Jan. 31, 2020

(86) PCT No.: PCT/US2020/016100
§ 371 (c)(1),
(2) Date: Jul. 29, 2021

(87) PCT Pub. No.: WO2020/160404
PCT Pub. Date: Aug. 6, 2020

(65) Prior Publication Data
US 2022/0106851 A1 Apr. 7, 2022

Related U.S. Application Data

(60) Provisional application No. 62/800,010, filed on Feb. 1, 2019.

(51) Int. Cl.
*E21B 33/08* (2006.01)
*C09K 3/00* (2006.01)
*C09K 3/10* (2006.01)

(52) U.S. Cl.
CPC .......... *E21B 33/085* (2013.01); *C09K 3/1021* (2013.01); *C09K 2003/1053* (2013.01)

(58) Field of Classification Search
CPC ................ E21B 33/085; C09K 3/1021; C09K 2003/1053
See application file for complete search history.

(56) References Cited

U.S. PATENT DOCUMENTS

| 3,323,773 A | 6/1967 | Walker | |
|---|---|---|---|
| 4,099,699 A * | 7/1978 | Allen | E21B 33/06 277/327 |
| 4,832,098 A | 5/1989 | Palinkas | |

(Continued)

FOREIGN PATENT DOCUMENTS

| EP | 1061231 A2 * | 12/2000 | ............. E21B 33/06 |
|---|---|---|---|
| EP | 1061231 A2 | 12/2000 | |

OTHER PUBLICATIONS

International Search Report from corresponding International Application No. PCT/US2020/016100, dated Jun. 18, 2020, three pages.

*Primary Examiner* — Matthew R Buck
(74) *Attorney, Agent, or Firm* — Nicanor A. Kohncke; Christopher L. McDavid; Ewa M. Wozniak (57) ABSTRACT

The present invention relates to sealing elements for blowout preventers comprising a sealing interface region, and a second region, wherein said sealing interface region is formed of a first polymer and said second region is formed of a second polymer, the first and second polymers having different Shore A hardnesses, including sealing elements made of dual hardness polyurethane.

15 Claims, 9 Drawing Sheets

(56) References Cited

U.S. PATENT DOCUMENTS

| | | | |
|---|---|---|---|
| 4,921,029 A | 5/1990 | Palinkas | |
| 4,934,425 A | 6/1990 | Gajewski | |
| 5,224,557 A * | 7/1993 | Yenulis | E21B 33/085 |
| | | | 251/1.1 |
| 5,605,657 A | 2/1997 | Nybakken | |
| 8,176,933 B2 * | 5/2012 | Huff | E21B 33/06 |
| | | | 251/1.2 |
| 9,580,987 B2 | 2/2017 | Liotta | |
| 2003/0065124 A1 | 4/2003 | Rosenberg | |
| 2012/0118559 A1 | 5/2012 | Li | |
| 2015/0275609 A1 | 10/2015 | Liotta | |
| 2016/0201422 A1 * | 7/2016 | Averill | E21B 33/06 |
| | | | 166/387 |
| 2018/0023361 A1 * | 1/2018 | Zonoz | E21B 33/062 |
| | | | 251/1.2 |
| 2018/0118925 A1 | 5/2018 | Gozalo | |
| 2018/0245419 A1 | 8/2018 | Mireles | |
| 2018/0258728 A1 * | 9/2018 | Zonoz | E21B 33/06 |

* cited by examiner

DUAL HARDNESS SEALING ELEMENTS FOR BLOWOUT PREVENTER

The present invention relates to sealing elements for blowout preventers comprising a sealing interface region, and a second region, wherein said sealing interface region is formed of a first polymer and said second region is formed of a second polymer, the first and second polymers having different Shore A hardnesses, including sealing elements made of dual hardness polyurethane.

BACKGROUND OF THE INVENTION

A blowout preventer ("BOP") is a mechanical device located on a well head that seals, controls and monitors the flow of gases or liquids from the well during drilling and production operations. Blowout preventers were developed to prevent uncontrolled flow from a well due to extreme variations in pressure within the wellbore. When actuated, it is configured to close off a wellbore during subterranean drilling or production operations (e.g., oil and gas drilling and production operations) to prevent an uncontrolled release or "blowout" of formation fluids at the surface (e.g., such as during a "kick" of uncontrolled, high pressure fluid migrating into the wellbore from the subterranean formation).

Blowout preventers consist of several parts including a sealing element also known as a packer. Illustrative of a sealing element is the "packer element" as described in U.S. Pat. No. 9,580,987, the contents of which are hereby incorporated as well as the "elastomeric packer" as described in WO2019/232052, the contents of which are hereby incorporated as well as the "elastomeric member" as described in US2018/0245419, the contents of which are hereby incorporated.

The sealing element is typically made from an elastomeric (e.g. rubber) material with single durometer (=hardness) with metal inserts that undergoes high deformation during opening and closing operations.

In general, the sealing element is seated on a piston that when actuated forces the sealing element against an upper housing, which, compresses the polymer of the sealing element against a pipe or the polymer itself to create a sealing interface. The piston moves a fixed distance and the metal inserts compress the polymer. There are multiple sealing interfaces around the circumference of the part between the polymer itself and any pipe within the wellbore. There are regions above and below the sealing element where the polymer is not constrained and free to expand or extrude when deflected.

Pressure on the blowout preventer (annular or spherical) is applied from the wellbore to the lower surface of the sealing element, which generates additional compressive forces on the seal.

Blowout preventer sealing elements may vary in designs within the knowledge of the industry. Various blowout preventers and sealing elements have been described in the past.

One specific type of blowout preventer, known as an annular blowout preventer ("annular BOP"), is designed to close off the annulus that exists between the borehole wall and any tools or tubing strings extending through wellbore, such that any fluid flow paths extending through the tools or tubing string remains open even after the annular blowout preventer has been actuated.

U.S. Pat. No. 3,323,773 discloses an annular preventer known as a spherical blowout preventer (SBOP) comprising a sealing means including a continuous ring of resilient material such as natural or synthetic rubber (e.g. Hycar-Buna having a Shore A hardness between 50-80).

US2015/0275609 discloses packer seals for spherical blowout preventers of an elastomeric material (e.g. rubber).

WO2019/232052 discloses an annular elastomeric packer for a blowout preventer comprising an elastomeric body.

US2018/0245419 discloses that elastomeric sealing elements may be constructed of any suitable material that may be deformed when placed under a load (e.g., a compressive load from the piston), but then return to its original shape when the load is removed (i.e., any material which is elastically deformable) such as, for example, nitrile rubber, natural rubber, hydrogenated nitrile rubber (HNBR), urethane, and/or silicone.

US2018/0258728 discloses an annular blowout preventer comprising an annular packer and an annular support structure, whereas the packer and the support structure are flexible components (e.g. polyurethane rubber) from the same or different materials, having a hardness between approximately 60 to 85 durometer Shore A.

There are multiple problems using a single durometer polymer to form the sealing element in a spherical blowout preventer. The compressive forces are not uniform within the sealing element with areas of high and low compressive strains. Low hardness polymers deform easily against a mating surface (such as a metal tube) to create a sealing interface but extrude under pressure and provide low sealing force. High hardness polymers have a higher modulus but do not sufficiently deflect under low compressive forces to form a sufficient sealing interface. A need has, therefore, been recognized in connection with a polymer for use in a sealing element having a balance of mechanical properties that are soft enough to form a sealing interface that does not extrude and can seal.

US2016/0201422 discloses an annular blowout preventer comprising a packer body fabricated from a first material and a second material disposed between the packer body and the opening. The second material is less rigid than the first material. The first and second material can be a (poly) urethane.

US2018/023361 discloses a ram-type blowout preventer comprising a sealing element including a body comprising an elastomeric material and an insert comprising a harder material section and a softer material section. Materials that may be used include polyurethane.

Surprisingly, it was discovered that the shortcomings of the state of the art could be overcome by sealing elements comprising more than a single durometer polymer to form a sealing interface that seals. The sealing element, in an embodiment of the invention, is formed using two or more polymers with different hardnesses (e.g., Shore A or D). A softer polymer with a compressive modulus that is sufficient to achieve the desired sealing pressure is used within the sealing interface region, which is the area of the sealing element that forms the sealing interface. In a second region adjacent to the sealing interface region, a second harder polymer is used to increase the compressive forces within the first polymer. The dual hardness of the sealing element of the present invention is employed to constrain the axial and radial deformation of the first polymer of the sealing interface region to concentrate the sealing force.

It was discovered, in another embodiment, that a sealing element designed with a lower hardness elastomer within the segment of the sealing element that contacts the sealing interface region and a higher hardness polymer in adjacent region (i.e., a second region) allows for integration of materials with different property sets for sealing and translating sealing forces within the sealing element.

Broadly in one embodiment of the invention there is a sealing element having an upper portion made from a polymer with a hardness of 60 to 98 Shore A (i.e., the sealing interface region). The lower portion of the sealing element is made from a polymer with a hardness that is higher than the first polymer (i.e., the second region). The second higher hardness polymer reduces or restricts the softer polymer from expanding or extruding creating higher compressive forces for a given displacement within the first polymer. A sealing element designed from two or more polymers provides greater utility to control the compressive sealing forces within the sealing element.

It was further discovered in one embodiment that the polymer exhibit a yield recovery of 75% to 99% after a first time stretch to design an effective sealing element. A drift test is used to measure the recovery of the sealing element after large strain deformations.

Yield recovery can be calculated by taking the delta of the maximum strain for a cycle and the strain at the intersection of unloading curve to 0 stress divided by the maximum strain for a cycle according to the following formula (1):

$$\text{Yield recovery } [\%] = (\varepsilon_{max} - \varepsilon_0)/\varepsilon_{max} \times 100 \quad (1)$$

whereas
$\varepsilon_{max}$ means the maximum strain of a cycle and
$\varepsilon_0$ means the strain at the intersection of unloading curve to 0 stress.

Stress strain curves of polymer materials can be measured according to ASTM D412 (Tensile elongation) at a strain rate of 20±2 inches/min.

Polymers which exhibit a yield recovery of less than 75% undergo large permanent deformations that lead to changes in the dimensions of the sealing element that are less desirable for making a functional spherical blowout preventer.

If not otherwise stated herein, it is to be assumed that all patents, patent applications, patent publications and other publications mentioned and cited herein are fully incorporated by reference as if set forth in their entirety.

For a better understanding of the present invention, together with other and further features and advantages thereof, reference is made to the following description, taken in conjunction with the accompanying drawings. The scope of the invention will be pointed out in the appended claims.

SUMMARY OF THE INVENTION

For a better understanding of the present invention, together with other and further features and advantages thereof, reference is made to the following description, taken in conjunction with the accompanying drawings, and the scope of the invention will be pointed out in the appended claims. As used in this description and the appended claims, the singular forms "a", "an", and "the" include plural referents unless the content clearly dictates otherwise.

There is broadly contemplated, in accordance with at least one presently preferred embodiment of the present invention, a sealing element comprising a sealing interface region and a second region, wherein said sealing interface region is formed of a first polymer and said second region is formed of a second polymer, the first and second polymers having different Shore A hardnesses as measured by ASTM D2240-15 test method for measuring durometer hardness.

In another embodiment, the first polymer has a Shore A hardness of 60 to 95 Shore A and the second polymer has a Shore A hardness higher than the first polymer, preferably at least 5 shore A points higher than the first polymer.

In a further embodiment, the first polymer has a yield recovery of 75% to 99%.

In a further embodiment, the sealing element comprises an upper portion and an lower portion, wherein the upper portion of the sealing element is formed from a 60 to <90 shore A polymer and the lower portion of the sealing element is formed from a 90 to 98 shore A polymer.

In a further embodiment, the sealing element comprises an upper portion and an lower portion, wherein the upper portion of the sealing element is formed from a 90 to 98 shore A polymer and the lower portion of the sealing element is formed from an 60 to <90 shore A polymer.

In a further embodiment, the sealing element comprises an inner circumferential portion and an outer circumferential portion, wherein the inner circumferential portion of the sealing element is formed from a 60 to <90 shore A polymer and the outer circumferential portion of the sealing element is formed from a 90 to 98 shore A polymer.

In a further embodiment, the sealing element comprises an inner circumferential portion and an outer circumferential portion, wherein the inner circumferential portion of the sealing element is formed from an 90 to 98 shore A polymer and the outer circumferential portion of the sealing element is formed from a 60 to <90 shore A polymer.

In a further preferred embodiment, the first and the second polymer comprise polyurethane.

In a further embodiment, the polyurethane is the reaction product of a polyurethane prepolymer, a curative and optionally additives.

In a further embodiment, the polyurethane prepolymer is the reaction product of a polyisocyanate and a polyol.

In a further embodiment, the polyisocyanate is selected from the group consisting of toluene diisocyanate, methylene diphenyl diisocyanate and para-phenylene diisocyanate.

In a further embodiment, the polyurethane prepolymer comprises less than 1 wt % free polyisocyanate monomer.

In a further embodiment, the curative is selected from the group consisting of MOCA (4,4'-Methylene-bis(2-chloroaniline)), MDA (4,4'-Methylene dianiline), butanediol (BD) and polycarbonate polyol (A3901).

The invention also related to a spherical or annular blowout preventer including a body, a piston disposed within the body, and a sealing element according to the invention disposed adjacent to the piston.

DETAILED DESCRIPTION OF THE INVENTION

The description that follows includes exemplary apparatus, methods, techniques, and instruction sequences that embody techniques of the inventive subject matter. However, it is understood that the described embodiments may be practiced without these specific details.

As used herein a sealing element or packer element is understood to be an article capable of use in a blowout preventer for sealing and thereby reducing or stopping the amount of fluids, for example, oil and gas, that flow out from a wellbore. Use of the sealing elements as described herein is not limited to any specific design. For example, suitable sealing systems used in blowout preventers are known in the art, such as described in US2015/275609, US2016/201422, US2018/245419, WO2019/232052. The presently disclosed sealing elements may be used, for example, in sealing systems for any application known in the field, including, but not limited to oil drilling, wells, etc. Skilled artisans will appreciate the benefits and advantages described herein of using the present sealing elements for such applications.

Polymers useful in the invention include those having the desired sealing and hardness properties. Durometer hardness is typically measured according to ASTM D2240-15 test method.

In one embodiment, polyurethane is employed as the material of the sealing element. According to this invention, the term polyurethane comprises also polyurethane-urea polymers. Polyurethanes of the invention are obtainable for example by mixing a polyurethane prepolymer and curing the modified polymer with a curative, such as a chain extender, cross-linker, or polyol and combinations thereof.

In one embodiment of the invention, the polyurethane prepolymer is obtained by the reaction of polyisocyanate and polyol.

In one embodiment of the invention, the polyisocyanate is selected from the group consisting of toluene diisocyanate, methylene diphenyl diisocyanate and para-phenylene diisocyanate, preferably toluene diisocyanate.

In one embodiment of the present invention, the prepolymer comprises less than 1 wt % free polyisocyanate monomer, preferably less than 0.5 wt % free polyisocyanate monomer and more preferably less than 0.1 wt % free polyisocyanate monomer.

Suitable polyurethane prepolymers are commercially available at LANXESS and include, without restrictions, TDI-Poly(ethyleneadipate(glycol) prepolymers such as Adiprene® LF 1800, Adiprene® LF 1860, Adiprene® LF 1900, Adiprene® LF 1930 and Adiprene® LF 1950 or Adiprene® E900 (MDI-Polyether).

In one embodiment of the invention, the curative is selected from the group consisting of MOCA (4,4'-Methylene-bis(2-chloroaniline)), MDA (4,4'-Methylene dianiline), butanediol (BD) and polycarbonate polyol (A3901).

Suitable curatives are commercially available at LANXESS and include, without restrictions, Vibracure® A-133 (MOCA).

The polyurethane and the polyurethane prepolymers of the invention are made using standard reaction processes and conditions as known in the art for the production of polyurethane prepolymers and polyurethane generally. Illustrative processes are described by way of example in U.S. Pat. Nos. 4,832,098, 4,934,425, 4,921,029, 4,784,201, and 5,605,657 and US2003/0065124, the contents and disclosures of which are hereby incorporated by reference.

In one embodiment a polyurethane-urea made of a toluene diisocyanate Poly(ethyleneadipate(glycol) polyurethane prepolymer (TDI-PEAG) cured with MOCA (4,4'-Methylene-bis(2-chloroaniline)) having a shore A hardness of 80 to 95 is used for a first polymer of the sealing element.

In one embodiment of the present invention, the upper portion of the sealing element is formed from a 60 to <90 shore A polymer and the lower portion of the sealing element is formed from a 90 to 98 shore A polymer.

In an alternative embodiment, the upper portion of the sealing element is formed from a 90 to 98 shore A polymer and the lower portion of the sealing element is formed from an 60 to <90 shore A polymer.

The thickness of the upper portion and the lower portion may vary and the ratio of the thickness of the upper portion (c) to the thickness of the lower portion (d) may be from 10:1 to 1:10, preferably 5:1 to 1:5, more preferably 3:1 to 1:3 and most preferably 2:1 to 1:2.

In one embodiment of the invention, the inner circumferential portion of the sealing element is formed from a 60 to <90 shore A polymer and the outer circumferential portion of the sealing element is formed from a 90 to 98 shore A polymer.

In an alternative embodiment of the invention, the inner circumferential portion of the sealing element is formed from an 90 to 98 shore A polymer and the outer circumferential portion of the sealing element is formed from a 85 to <90 shore A polymer.

The thickness of the outer circumferential portion and inner circumferential portion may vary and the ratio of the thickness of the outer portion (a) to the thickness of the inner portion (b) may be from 10:1 to 1:10, preferably 5:1 to 1:5, more preferably 3:1 to 1:3 and most preferably 2:1 to 1:2.

In another embodiment of the invention, the outer circumferential portion of the sealing element is formed from an 90 to 98 shore A polymer and the outer circumferential portion of the sealing element is formed from a 60 to <90 shore A polymer, whereas the hardness of the outer circumferential portion of the sealing element is at least 5 shore A points higher than the inner circumferential portion of the sealing element.

In another embodiment of the invention, there is a sealing element (annular or spherical) comprising one or more metal inserts and at least two polymers of different modulus, wherein the softer elastomer is used in the highest strain region of the metal inserts and the higher modulus material is used to constrain the extrusion of the elastomer and thereby increasing the sealing force.

In one embodiment of the invention, the sealing element for a blowout preventer comprises a sealing interface region, a second region and metal inserts, wherein said sealing interface region is formed a polyurethane wherein the polyurethane is the reaction product of a polyurethane prepolymer and a curative, wherein the polyurethane prepolymer is the reaction product of a polyisocyanate and a polyol, wherein the polyisocyanate is toluene diisocyanate, and has a Shore A hardness of 60 to 95 Shore A measured by ASTM D2240-15 test method for measuring durometer hardness, wherein the second region is formed of a polyurethane which has a Shore A hardness at least 5 shore A points higher than the polyurethane of the first region.

The invention is further related to a spherical or annular blowout preventer, preferably a spherical blowout preventer, including a body, a piston disposed within the body, and a sealing element (packer assembly) according to the present invention disposed adjacent to the piston. In one embodiment of the invention, a cylindrical portion of the inside surface of the sealing element of the spherical or annular blowout preventer is formed from a polymer with a lower hardness, while the remaining portions of the sealing element are made from a polymer with a higher hardness, preferably with a hardness that is 5 shore A points higher than the polymer forming the cylindrical portion of the inside surface of the sealing element.

BRIEF DESCRIPTION OF THE SEVERAL VIEWS OF THE DRAWINGS

So that the above recited features and advantages can be understood in detail, a more particular description, briefly summarized above, may be had by reference to the embodiments thereof that are illustrated in the appended drawings. It is to be noted, however, that the appended drawings illustrate examples and are, therefore, not to be considered limiting of its scope. The figures are not necessarily to scale and certain features and certain views of the figures may be shown exaggerated in scale or in schematic in the interest of clarity and conciseness.

Figure 1:
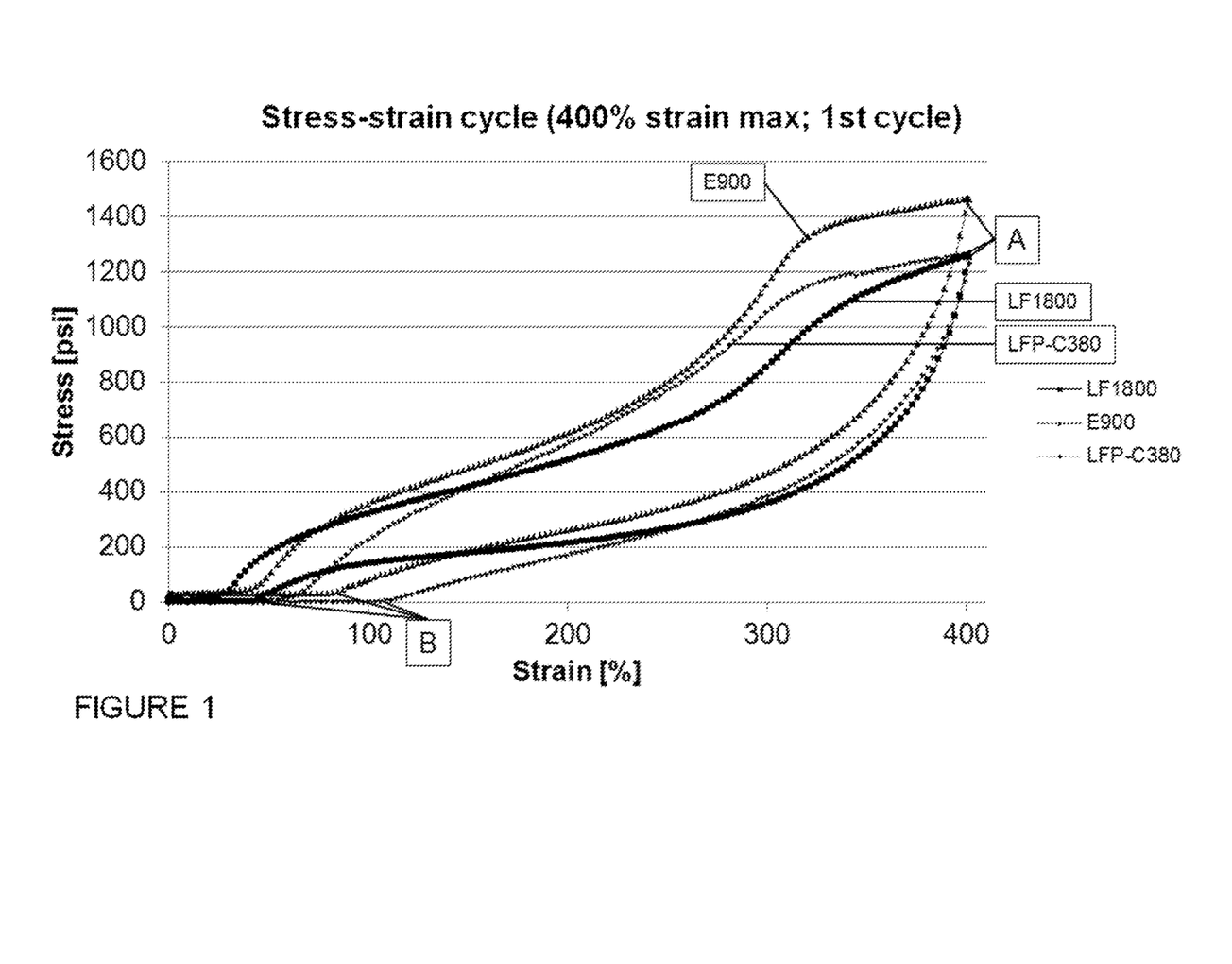
FIGS. 1 and 2 schematically illustrate stress-strain curves of various cured polyurethanes.
Figure 2:
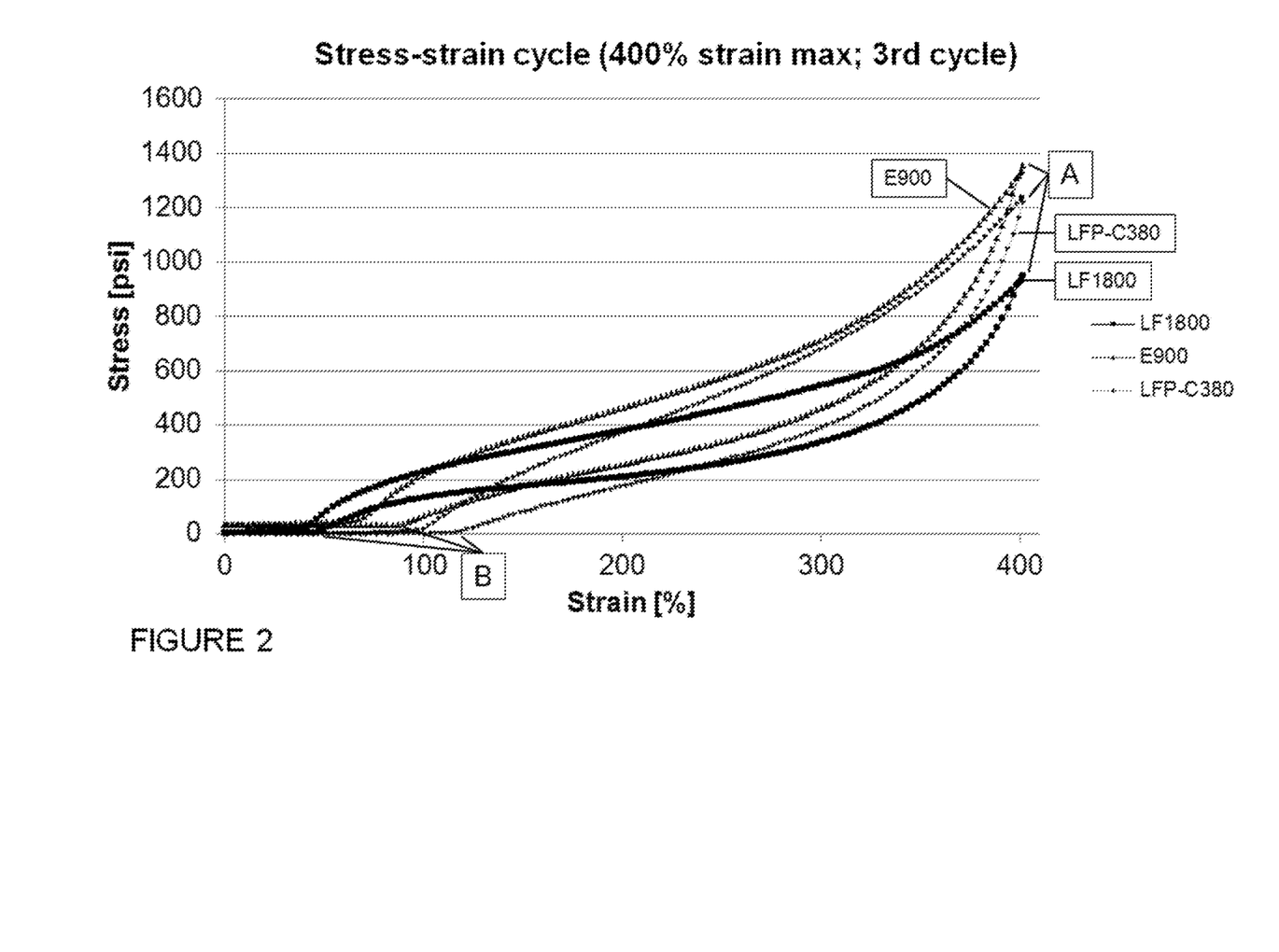

FIGS. 1 and 2 depict graphs of the stress-strain cycle analysis of various polyurethanes. FIG. 1 depicts the stress-strain curves of the polyurethanes after the first cycle at a maximum strain of 400%, while FIG. 2 depicts the stress-strain curves of the polyurethanes after the third cycle at a maximum strain of 400. Point A indicates the maximum strain of 400% of the stress-strain curves. Point B indicates the intersection of the unloading curve a 0 stress. The upper curves are the loading curves, while the lower curves (from A to B) are the unloading curves.

Figure 3:
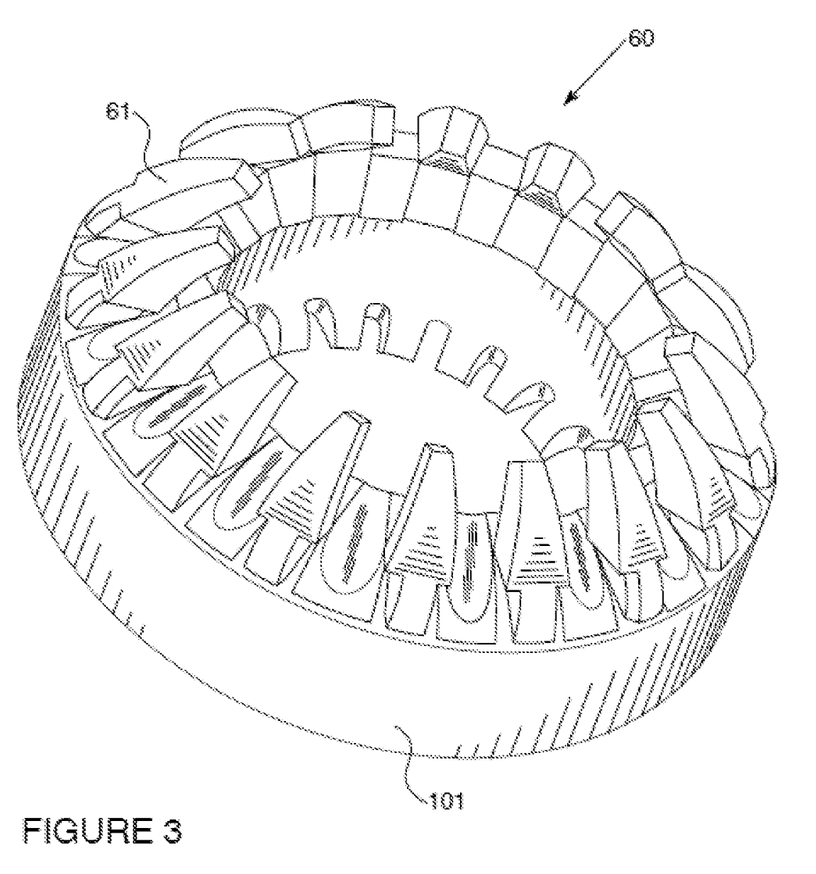
FIG. 3 schematically illustrates a sealing element in accordance with at least one embodiment of the present invention.

FIG. 3 depicts a view of the sealing element 60 removed from the blowout preventer 10 with the fingers 61 in the unsealed position.

Figure 4:
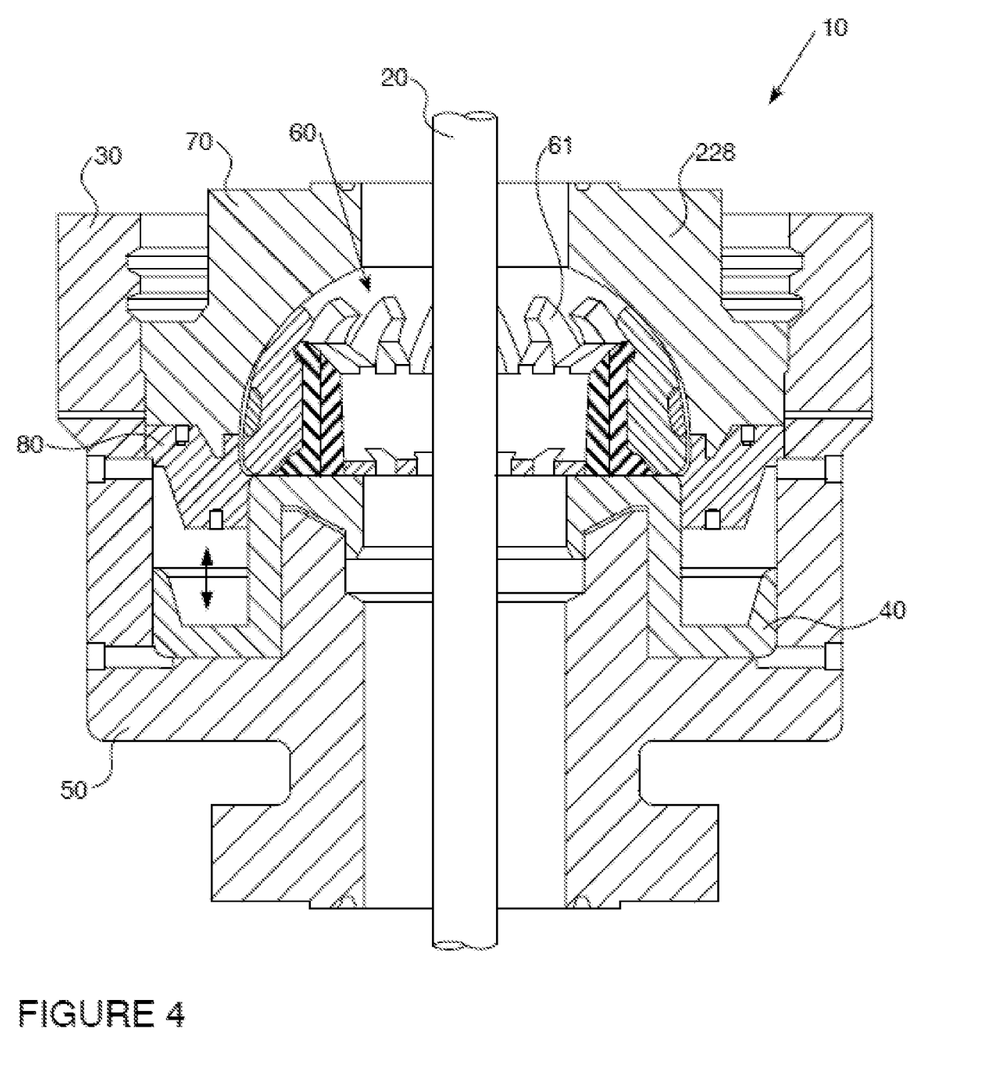
FIG. 4 schematically illustrates a cross section of a sealing element in unsealed position in a spherical blowout preventer.
Figure 5:
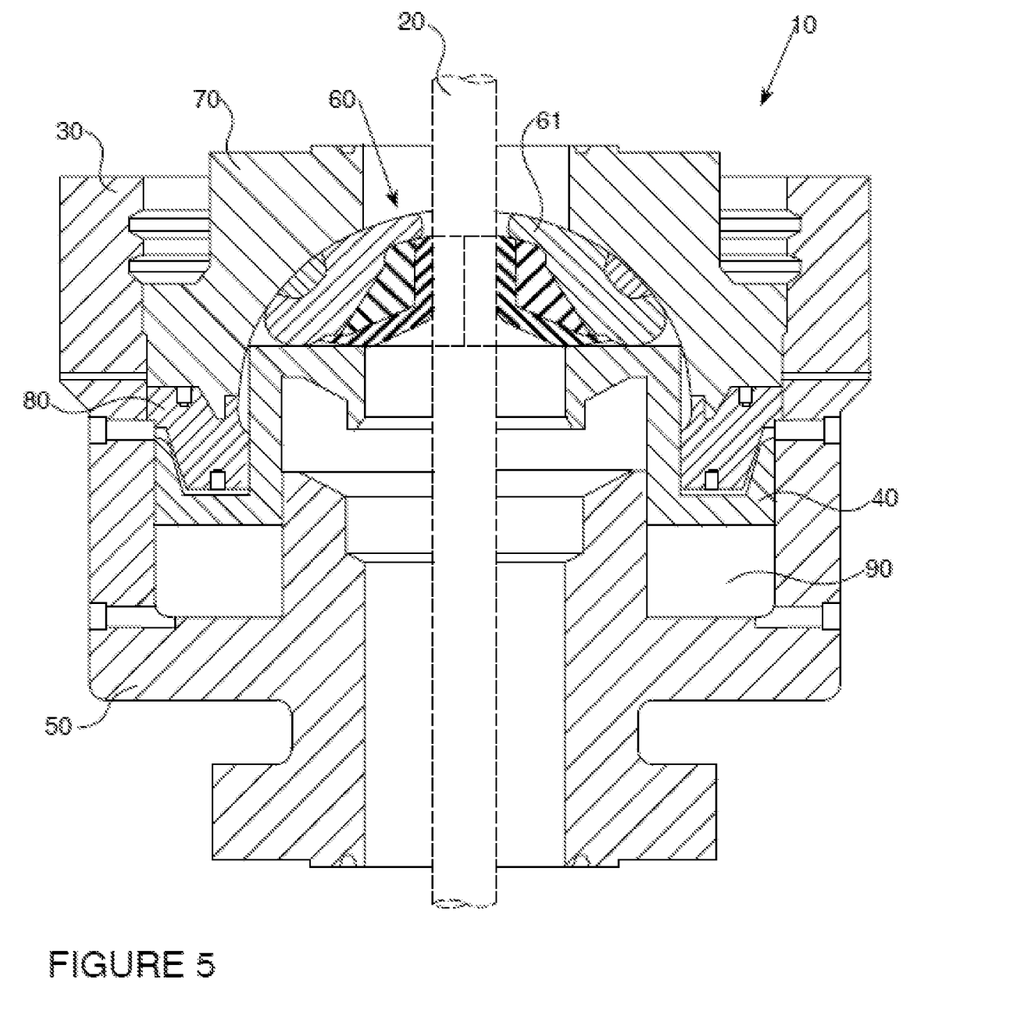
FIG. 5 schematically illustrates a cross section of a sealing element in sealed position in a spherical blowout preventer.

As shown in FIG. 3, in the unsealed (or uncompressed position), the sealing element 60 includes a ring shaped body 101 with fingers 61 embedded therein. The sealing element 60 may be molded or casted about the fingers 61. The sealing element 60 may be compressible and/or energizable by movement of the fingers 61 as shown in FIGS. 4 and 5. The sealing element 60 is formed of a first polymer and a second polymer in the blowout preventer 10.

FIGS. 4 and 5 depict an example version of the blowout preventer 10.

FIG. 4 shows the blowout preventer 10 including a housing 30 with a sealing element 60 therein in an unsealed position. FIG. 5 shows the blowout preventer 10 with the sealing element 60 in a sealed position. The blowout preventer 10 includes a piston 40 and a sealing element 60. The housing 30 includes a wellbore portion 50 and a riser portion 70 with a housing ring 80 therebetween. The wellbore portion 50 has a body with a channel 51 to receive tubing 20 therethrough. The sealing element 60 includes fingers 61 and a ring shaped body 101. The housing cavity 90 is configured to receive the riser portion 70 and the housing ring 80 therein. The sealing element 60 is disposed about the fingers 61 and energizable by movement of the sealing element 60. The sealing element 60 may be energized by movement of the fingers 61 towards the tubing 20 as shown in FIG. 5.

As shown in FIG. 5, the sealing element 60 is expandable about the fingers 61 to form seals with various portions of the blowout preventer. The outer surface of the sealing element 60 extends between the fingers 61 to form a seal along the curved surface of the riser portion 70.

The inner surface 110 of the sealing element 60 may be compressed together to close the flow path to form a seal. The inner surface 110 may converge for self-sealing, or to seal with the tubing 20, if present.

The size of the sealing element 60 may be provided to seal the flow path. The fingers 61 may be used to support the sealing element 60 towards the sealed position, thereby reducing the amount of material required to sufficiently seal the flow path. When the sealing element 60 is moved back to the unsealed position, the sealing element 60 may return to an original, retracted, and/or open position with a diameter therein.

Figure 6:
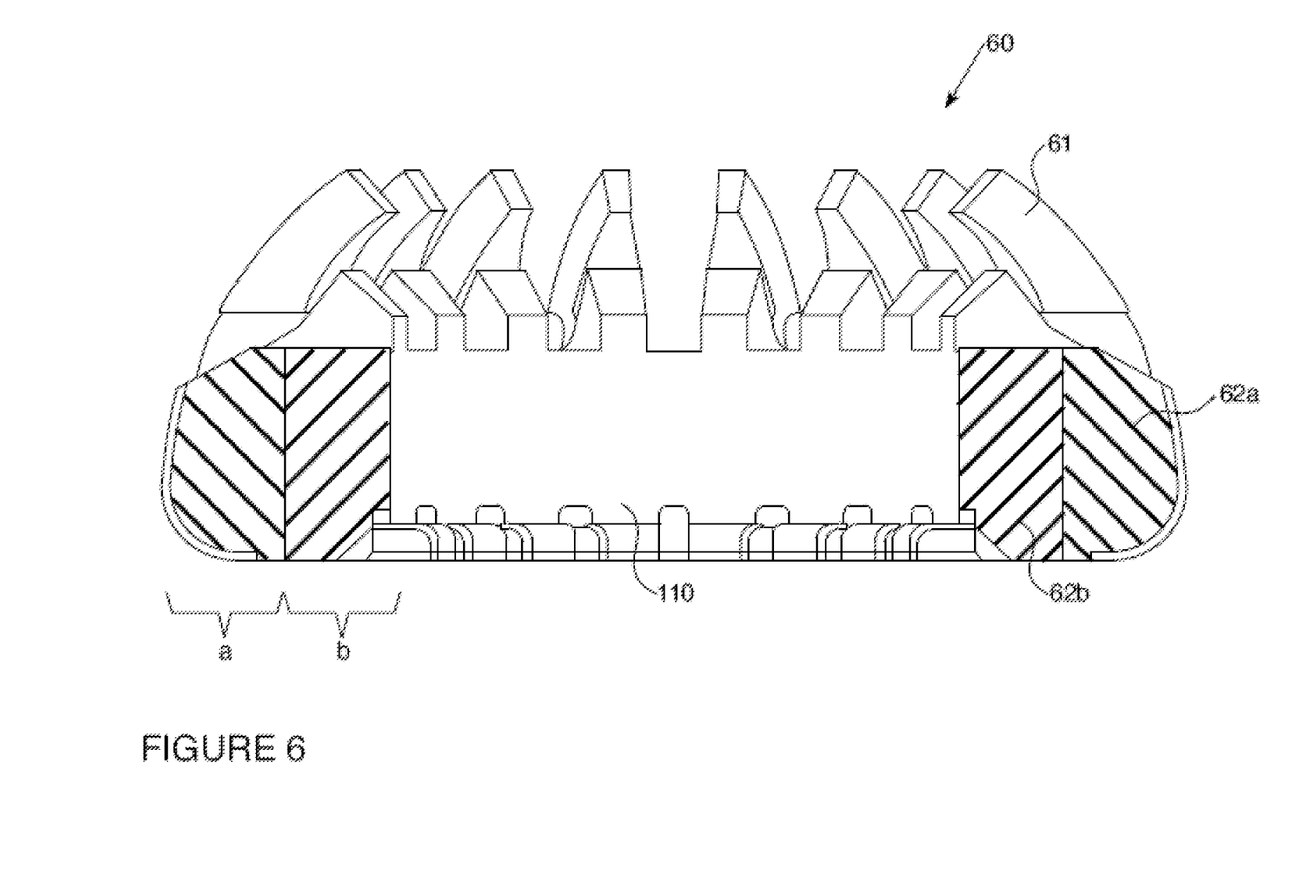
FIG. 6 schematically illustrates a cross section of a sealing element whereas the sealing element comprises an outer and an inner circumferential portion.
Figure 7:
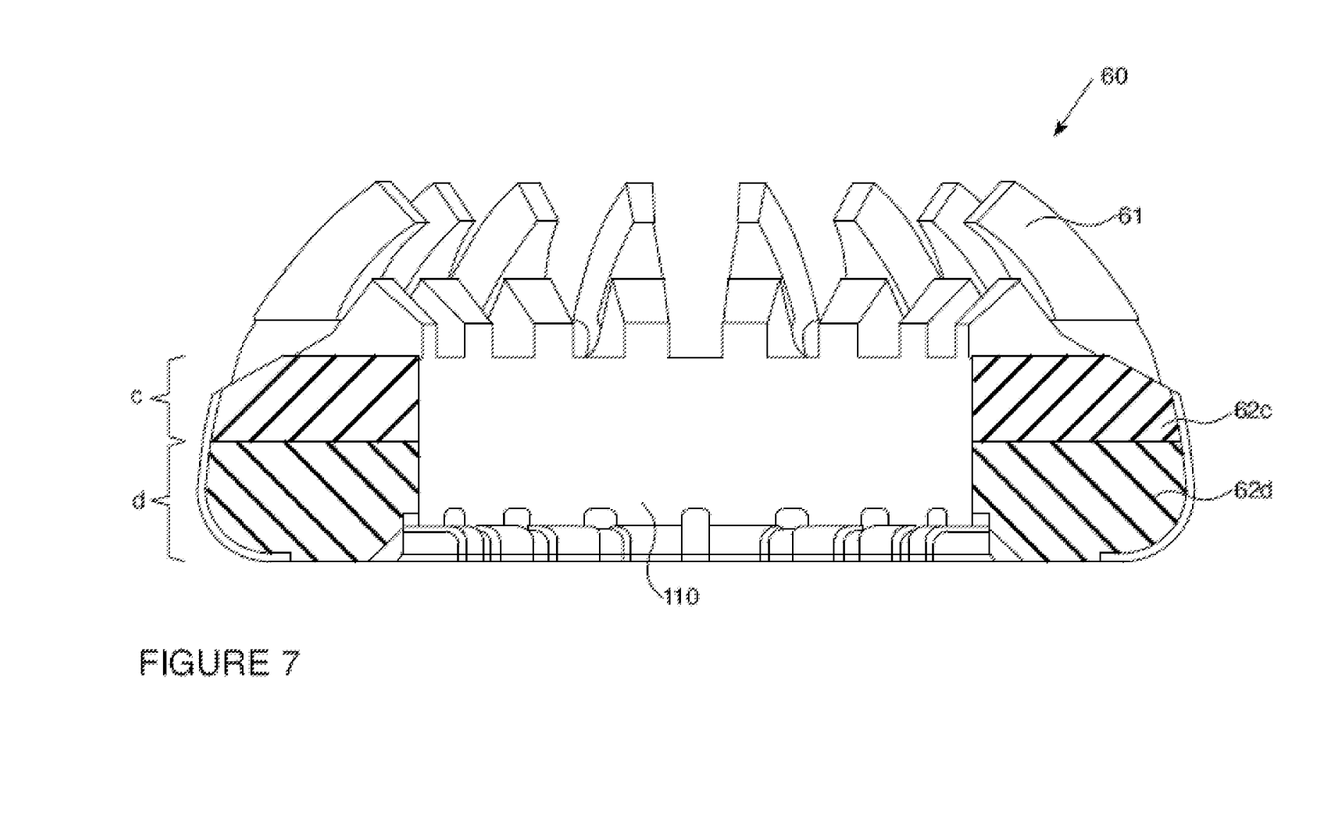
FIG. 7 schematically illustrates a cross section of a sealing element whereas the sealing element comprises an upper and a lower portion.

FIGS. 6 and 7 depict the unsealed (or uncompressed position) of the sealing element 60 includes a ring shaped body 101 with fingers 61 embedded therein. The ring shaped body 101 may be molded about the fingers 61. The sealing element 60 may be compressible and/or energizable by movement of the fingers 61. The sealing element 60 has a plurality of fingers, preferably 6 to 20 fingers, more preferably 8 to 16 fingers. FIG. 6 illustrates a sealing element 60 with an outer circumferential portion 62a of the thickness (a) formed of a first polymer and an inner circumferential portion 62b of the thickness (b) formed of a second polymer. FIG. 7 illustrates a sealing element 60 with an upper portion 62c of the thickness (c) formed of a first polymer and an inner circumferential portion 62d of the thickness (d) formed of a second polymer.

Figure 8:
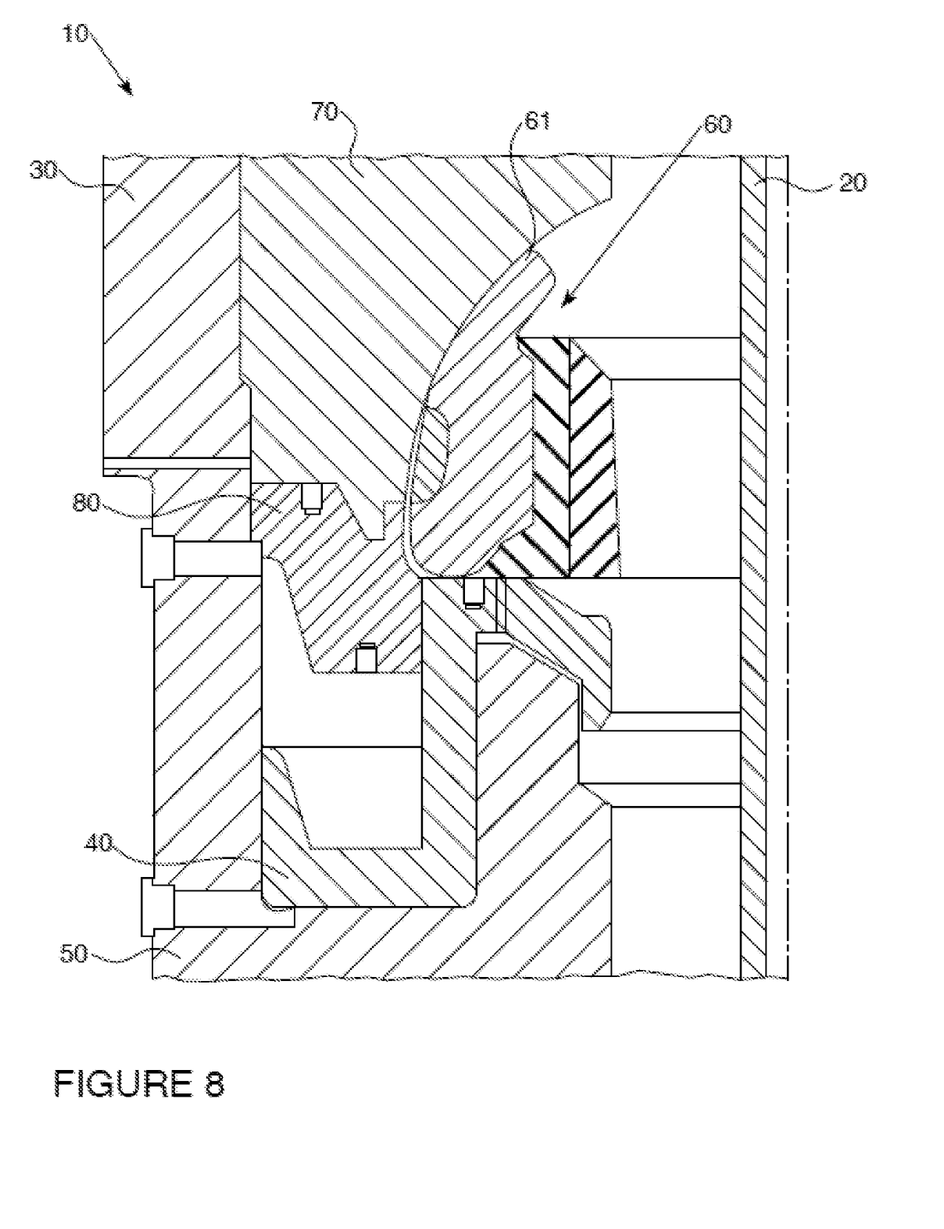
FIG. 8 schematically illustrates a cross section of one finger of the sealing element in unsealed position in a spherical blowout preventer.
Figure 9:
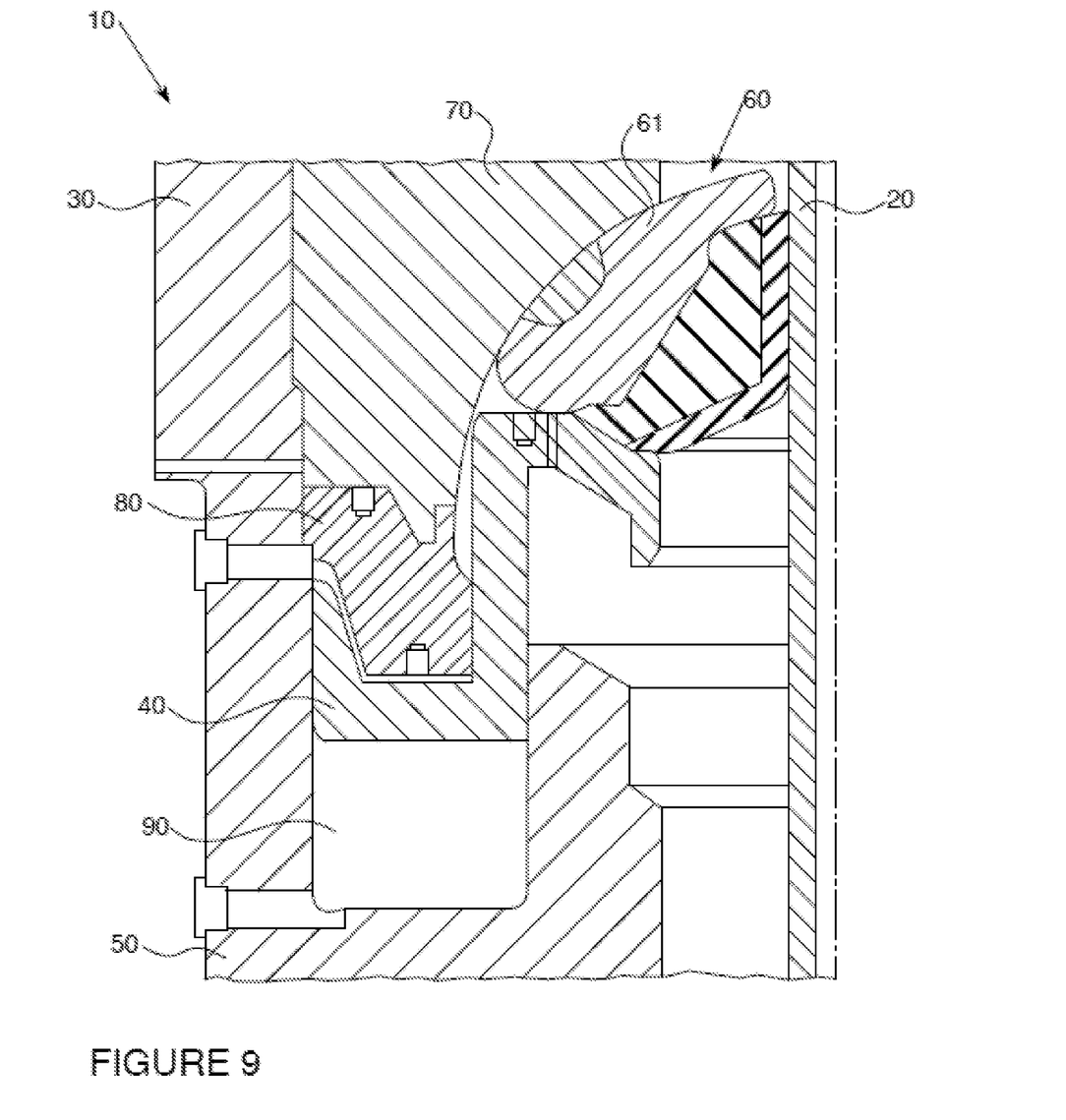
FIG. 9 schematically illustrates a cross section of one finger of the sealing element in sealed position in a spherical blowout preventer.

FIGS. 8 and 9 depict a cross section of a segment of the sealing element 60 in the blowout preventer 10. FIG. 8 shows the blowout preventer 10 including a housing 30 with a sealing element 60 therein with one finger 61 shown in an unsealed position. FIG. 9 shows the blowout preventer 10 with the sealing element 60 in a sealed position. The blowout preventer 10 includes a piston 40 and a sealing element 60 with one finger 61 shown. FIG. 9 illustrates the sealing interface of the sealing element 60 and the tubing 20.

Although the preferred embodiments of the present invention are described herein, it is to be understood that the invention is not limited to that precise embodiment, and that various other changes and modifications may be affected therein by one skilled in the art without departing from the scope or spirit of the invention. The following examples are illustrative of a practice of the invention, but are not meant to be considered as limiting the scope of the invention.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

EXAMPLES

The following materials were used for the performed experiment:
Polyurethane Prepolymers:

Adiprene ® LF1800   LF TDI-Ester polyurethane prepolymer; <0.1 wt %
                   free TDI monomer; 80 Shore A; commercially
                   available at LANXESS;

-continued

| | |
|---|---|
| Adiprene ® E900 | LF MDI-Ether polyurethane prepolymer; <0.1 wt % free TDI monomer; 90 Shore A; commercially available at LANXESS; |
| Adiprene ® LFP C380 | LF PPDI-Polycaprolactone polyurethane prepolymer (NCO % = 3.80); <0.1 wt % free TDI monomer; 83 Shore A; commercially available at LANXESS; |
| Curatives: | |
| MOCA | 4,4'-Methylene-bis(2-chloroaniline) |
| C3 | 4,4'-Methylene dianiline (MDA) |
| BD | butanediol |
| A3901 | polycarbonate polyol, (Mw 2000 g/mol) |

Adiprene® LF 1800 was cured with MOCA, Adiprene® E900 was cured with C3 and Adiprene® LFP C380 was cured with BD and A3901 to form cured polyurethane elastomers. The stress-strain curves of these polyurethane elastomers was measured according to ASTM D412 (Tensile elongation) at a strain rate of 20±2 inches/min in a Uniaxial Tension Step Sequence. Stress-strain curves were measured for 3 cycles each in consecutive increments at 25% strain, 50% strain, 100% strain, 200% strain. 300% strain and 400% strain.

As shown in FIGS. 1 and 2, the yield recovery for a polyurethane based on Adiprene® LF1800 cured with MOCA, Adiprene® E900 cured with C3 and Adiprene® LFP C380 was cured with BD and A3901 is shown below in Table 1 after the $1^{st}$ (FIG. 1) and $3^{rd}$ cycle (FIG. 2).

Table 1. Stress-strain data of polyurethanes elastomers of the intersection of the unloading curve at 0 stress after $1^{st}$ and $3^{rd}$ cycle (400% strain; Uniaxial Tension Step Sequence)

| | 1st Cycle | 3rd Cycle |
|---|---|---|
| LF1800 – Loading | 26% | 39% |
| LF1800 – Unloading | 45% | 47% |
| Unloading – loading = | 19% | 8% |
| Yield recovery | 88.75% | 88.25% |
| E900 – Loading | 44% | 62% |
| E900 – Unloading | 87% | 92% |
| Unloading – loading = | 43% | 30% |
| Yield recovery | 78.25% | 77% |
| LFP C380 – Loading | 65% | 94% |
| LFP C380 – Unloading | 114% | 119% |
| Unloading – loading = | 49% | 25% |
| Yield recovery | 71.5% | 70.25% |

Yield recovery can be calculated by taking the delta of the maximum strain for a cycle and the strain at the intersection of unloading curve to 0 stress divided by the maximum strain for a cycle according to the following formula (1):

$$\text{Yield recovery } [\%] = (\varepsilon_{max} - \varepsilon_0)/\varepsilon_{max} \times 100 \quad (1)$$

whereas $\varepsilon_{max}$ means the maximum strain of a cycle and $\varepsilon_0$ means the strain at the intersection of unloading curve to 0 stress.

Cured Adiprene® LF 1800 and cured Adiprene® E900 showed desirable yield recovery of more than 75% compared to cured Adiprene® LFP C380 and are suitable as first polymers in the sealing interface region of the sealing element of the blowout preventer.

The comparison of loading curve and unloading curve represents differences in the polyurethane elastomer recovery. The stress-strain curve differs between the 1st cycle and the 3rd cycle (see FIG. 1 and FIG. 2). The unloading stress strain curve represents the softest material condition. A recovery of 75% to 99% fosters a dimensional stable sealing element.

SBOP made of a single polymer does not achieve the desired sealing force.

What is claimed is:

1. A sealing element for a blowout preventer comprising: a sealing interface region, and
   a second region,
   wherein said sealing interface region is formed of a first polymer and said second region is formed of a second polymer,
   wherein the first polymer has a yield recovery of 75% to 99%;
   wherein the first and second polymers comprise polyurethane and the first and second polymers having different Shore A hardnesses as measured by ASTM D2240-15 test method for measuring durometer hardness,
   wherein the sealing element comprises an upper portion and a lower portion and wherein either (i) the upper portion of the sealing element is formed from an 60 to <90 shore A polymer and the lower portion of the sealing element is formed from a 90 to 98 shore A polymer or (ii) the upper portion of the sealing element is formed from a 90 to 98 shore A polymer and the lower portion of the sealing element is formed from a 60 to <90 shore A polymer.

2. The sealing element according to claim 1, wherein the first polymer has a Shore A hardness of 60 to 95 Shore A and the second polymer has a Shore A hardness higher than the first polymer.

3. The sealing element according to claim 1, wherein the sealing element comprises an inner circumferential portion and an outer circumferential portion, wherein the inner circumferential portion of the sealing element is formed from a 60 to <90 shore A polymer and the outer circumferential portion of the sealing element is formed from a 90 to 98 shore A polymer.

4. The sealing element according to claim 1, wherein the sealing element comprises an inner circumferential portion and an outer circumferential portion, wherein the inner circumferential portion of the sealing element is formed from an 90 to 98 shore A polymer and the outer circumferential portion of the sealing element is formed from a 60 to <90 shore A polymer.

5. The sealing element of claim 1, wherein the polyurethane is the reaction product of a polyurethane prepolymer and a curative.

6. The sealing element according to claim 5, wherein the polyurethane prepolymer is the reaction product of a polyisocyanate and a polyol.

7. The sealing element according to claim 6, wherein the polyisocyanate is selected from the group consisting of toluene diisocyanate, methylene diphenyl diisocyanate and para-phenylene diisocyanate.

8. The sealing element according to claim 6, wherein the polyurethane prepolymer comprises less than 1 wt % free polyisocyanate monomer.

9. The sealing element according to claim 6, wherein the curative is selected from the group consisting of MOCA (4,4'-Methylene-bis(2-chloroaniline)), MDA (4,4'-Methylene dianiline), butanediol (BD) and polycarbonate polyol (A3901).

10. The sealing element according to claim 6, wherein the polyisocyanate is toluene diisocyanate.

11. The sealing element according to claim 6, wherein the polyurethane prepolymer comprises less than 0.5 wt % free polyisocyanate monomer.

12. The sealing element according to claim 6, wherein the polyurethane prepolymer comprises less than 0.1 wt % free polyisocyanate monomer.

13. The sealing element according to claim 1, further comprising one or more metal inserts.

14. The sealing element according to claim 1, wherein the first polymer has a Shore A hardness of 60 to 95 Shore A and the second polymer has a Shore A hardness at least 5 shore A points higher than the first polymer.

15. A spherical or annular blowout preventer including a body, a piston disposed within the body, and a sealing element according to claim 1 disposed adjacent to the piston.

* * * * *